May 12, 1942.　　　　C. H. LUBY　　　　2,282,421
REINFORCING MATERIAL AND METHOD OF PRODUCING SAME
Filed Jan. 25, 1940
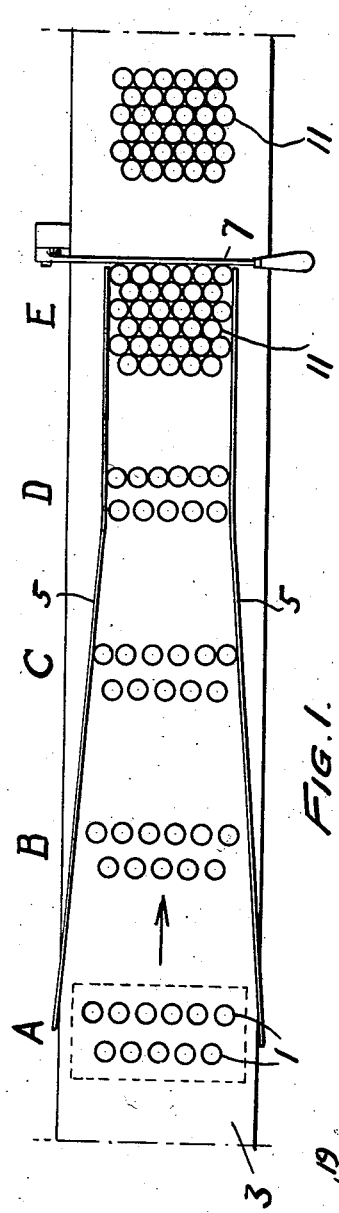
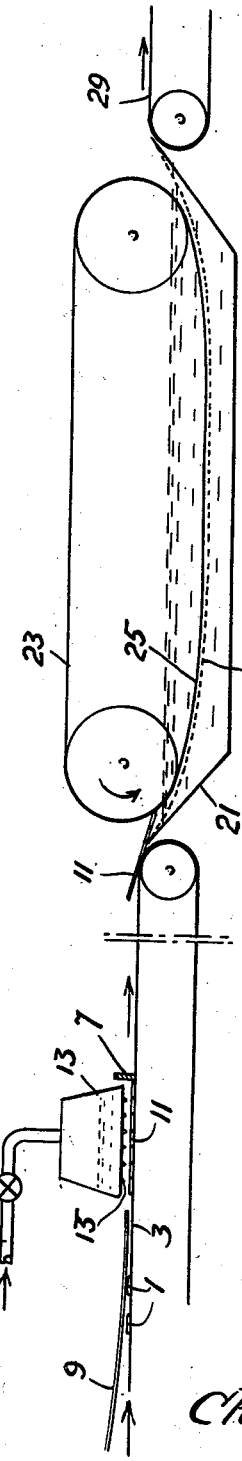
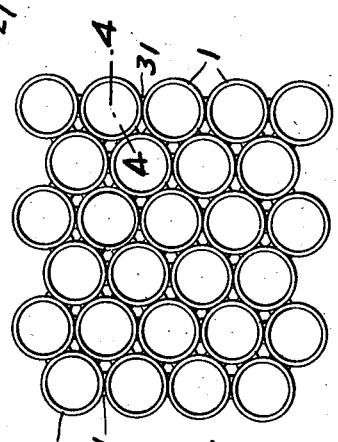
WITNESS:
Rob R Mitchel
INVENTOR
Charles H. Luby
BY
Busser & Harding
ATTORNEYS.

Patented May 12, 1942

2,282,421

UNITED STATES PATENT OFFICE 2,282,421

REINFORCING MATERIAL AND METHOD OF PRODUCING SAME

Charles H. Luby, Philadelphia, Pa.

Application January 25, 1940, Serial No. 315,539

13 Claims. (Cl. 18—48)

This invention relates to an improved type of reinforcing material and to methods for its production.

It is an object of this invention to produce a strong, light-weight, attractive, inexpensive reinforcing material that may be used in packaging various articles of merchandise for shipment or display to strengthen and add to the attractiveness of the packages formed.

The reinforcing material in accordance with this invention will desirably be produced in sheet form, and preferably will be thermoplastic in nature so that the sheets, under the influence of mild heat, may be shaped to any desired form. Preferably, also, the sheets will have an open or lattice type of construction, both so as to facilitate their shaping and to insure a considerable measure of visibility to articles of merchandise packaged therein.

In its preferred embodiment the reinforcing material in accordance with this invention will comprise a sheet formed by the association of a plurality of flat, open-centered elements formed of some thermoplastic material. These open-centered elements, which may be in the form of triangles, quadrangles, other polygons of various type, or circles, are arranged in juxtaposition in any desired pattern, and sealed or otherwise secured together at their points or lines of contact with each other to form a sheet.

Any thermoplastic material may be used to form the open-centered elements from which the reinforcing sheet is made, as, for example, a nitrocellulose or cellulose acetate plastic, any of the thermoplastic synthetic resins, etc., with or without fillers, etc., but because of its low cost, ease of fabrication and strength, I prefer to use a thermoplastic material formed by treatment of a vegetable protein, as zein, gliadin, hordin, etc., in the manner hereinafter described.

The open-centered elements for use in accordance with this invention will desirably, for strength in the finished sheet, have a maximum outside diameter of from 8 to 24 times the width of the rim portion. Thus, for a ring-shaped element with a rim 1/16" wide, the outer diameter may well be 3/4". The thickness of the open-centered elements will desirably, for satisfactory flexibility and easy shaping when heated, be not substantially in excess of the rim width.

The open centered elements for use in accordance with this invention may conveniently be formed from various thermoplastic materials by extruding a tube of such material of the desired cross-sectional shape, and then slicing the tube at right angles to form elements of desired thickness. However, when using a vegetable protein, the open centered elements will preferably be formed as described hereinafter.

The reinforcing sheet in accordance with my invention may be formed by securing the open centered elements in any desired pattern and manner. Preferably, however, for greatest strength, the sheet will comprise a plurality of annular elements, or rings, associated in a tightly packed configuration, with each ring (except at the edges of the sheet) having six equispaced points of contact with other rings. And desirably the elements will be secured to each other by a bond formed of identical material, and indeed, preferably formed of the very substance of the adjoining elements, which are, so to speak, fused together.

The further details and objects of this invention may best be described in connection with the accompanying drawing, which illustrates the formation of a sheet of reinforcing material from a vegetable protein such as zein, and in which—

Figure 1 is a diagrammatic showing, in plan view, of the preliminary steps in the forming of the reinforcing material;

Figure 2 is a diagrammatic showing, in elevation, containuing the operations illustrated in Fig. 1;

Figure 3 is a plan view of a completed section of reinforcing material in accordance with this invention; and Figure 4 is a section on the line 4—4 in Fig. 3.

In forming a sheet of reinforcing material in accordance with this invention from a vegetable protein such as zein, gliadin or hordin, the protein, which for convenience will be referred to hereinafter as zein, in the form of a commercial product containing preferably less than 1% fat and about 10 to 12% moisture, is ground to a rather fine powder, for example having a fineness of from about 40 to about 100 mesh, and is then fed to a tableting machine of conventional type equipped with dies that will produce an open-centered element of the particular form desired, as for example, a ring.

In this machine the finely ground zein is compressed in the cold without the use of heat to soften the protein or render it plastic, for example, at a temperature not substantially in excess of 100° F., under high pressure, which may run up to 10 tons per square inch.

The ring-shaped elements of compressed zein thus produced differ physically from the ground zein powder only in being compacted. They are non-homogeneous and granular, and while they possess sufficient strength to resist breakage by ordinary handling, etc., do not possess any great degree of strength and may easily be broken between the fingers.

In accordance with this invention, these ring-shaped tablets of compressed zein will be ejected from the tableting machine, which preferably will be equipped to form simultaneously a plurality of elements, onto a moving conveyor belt. In Fig. 1 the annular elements of compacted zein have been designated by the reference character 1 and are ejected from the tableting machine onto the moving conveyor belt 3 at the position indicated as "A." Eleven annular elements, arranged in a 6-5 pattern, are indicated as ejected simultaneously, but it will be appreciated that any desired number may be formed and ejected at one operation. The pattern arrangement, with alternate rows having one less element in them than the adjacent alternate rows, will, however, for reasons hereinafter indicated, preferably be kept.

The motion of the conveyor belt 3 carries the elements 1 forward in the direction of the arrow through position "B" to position "O," at which the converging stationary guides 5 engage the outer of the rings 1 and act to crowd the rings together so that they finally are arranged in the formation shown at position "D."

The forward motion of the rings upon the conveyor 3 continues until position "E" is reached, at which point the rings are engaged by the stationary arm 7 and their forward motion arrested. The guides 5 are here joined by a sloping cover member 9, which at position "E" is spaced from the conveyor 3 substantially only by the thickness of the rings 1, so that the rings, when stopped by the arm 7, cannot ride over one another but are forced by continued movement of the belt 3 to assume the formation indicated at 11, in which the rings are tightly packed, and, except at the outer edges, each ring has six points of contact with adjacent rings.

The compacted zein rings at position E and in the arrangement indicated at 11 are located directly beneath a container 13, the bottom 15 of which is provided with a plurality of fine openings of capillary size arranged in a pattern identical with that formed by the points of contact of the rings, so that each opening is directly above such a point of contact.

The container 13 contains a gelatinizing or hardening agent for the zein, such as, for example, ethyl alcohol, or more desirably, acetic acid of 50 to 95% strength. Preferably the agent used will be glacial acetic acid.

When the group of rings 1 has been arranged in the pattern 11 beneath container 13, compressed air will be admitted to the container through conduit 17 and valve 19, so that a drop of the gelatinizing agent will be forced out of each opening in the bottom 15 of the container and will fall upon the zein rings at the points where they are in contact with each other.

When this has been accomplished, the arm 7 will be raised and the group of rings 1 will continue their forward motion on the conveyor 3. Under the influence of the gelatinizing agent, the zein is softened at the points where the rings are in contact and caused to flow together to such an extent that the rings become bonded together to an extent sufficient to permit the handling necessary in further treatment without their being separated.

The patterns 11, after having been thus treated with the gelatinizing agent, are permitted to remain upon the conveyor 3 for a sufficient period of time for the gelatinizing and fusing action to become complete. The necessary period can be considerably shortened by allowing the patterns 11 to be heated to a temperature of about 100–120° F. They are then, as shown in Fig. 2, introduced into a tank 21 which contains a gelatinizing agent such as, for example, ethyl alcohol, concentrated acetic acid, etc., preferably glacial acetic acid. The patterns 11 are conveyed through the bath in the tank 21 by means of a traveling belt 23, the lower reach 25 of which holds the patterns 11 beneath the surface of the gelatinizing liquid on the perforated plate 27 so that the patterns 11 pass through the bath between the plate 27 and the lower reach 25 of the belt 23. The pattern should be immersed in the bath of gelatinizing agent for a period of from thirty seconds to about five minutes. The bath may be maintained at room temperature and in no event should the temperature of the bath exceed about 160 °F. If desired, the bath may contain a dye such as, for example, any alcohol soluble, or acid soluble dye, in which event the exterior, gelatinized portions, of the reinforcing sheet formed will be uniformly and permanently colored.

The patterns 11, on leaving the gelatinizing bath in tank 21, may be removed on a traveling conveyor 29 and will then be dried either at room temperatures or in dry rooms at temperatures of from about 80 to 90° F. Slow drying at relatively low temperatures is desirable, since it has been found that this will prevent any warping of the sheets. When drying has been completed, the sheets are in finished form and will be found to be flat and unwarped, with the rings retaining substantially their original shape, although the sharp corners produced by the dies will have been rounded. At the points of contact the material of the rings will be fused together to form a seal or point as strong or stronger than the ring itself.

The final product is shown in Figs. 3 and 4. The seal between the rings 1 has been indicated by the reference character 31, and it will be noted in Fig. 4 that each ring is composed of a gelatinized, homogeneous outer layer 33 surrounding an inner granular core of unaltered zein 35.

The finished sheets may be easily and readily shaped in any desired form by being heated to approximately 180° F., for example by immersion in water maintained at this temperature or somewhat above. Thus, the sheet may be softened by dipping for from 30 seconds to 2 minutes in boiling water and then shaped or molded about any desired form. If desired, sections of sheet material may be formed together either by softening the edges by heating as indicated and then holding the softened edges of several sections together, or by re-dipping the surfaces to be secured together in the gelatinizing agent and bringing them together and then allowing them to dry in such position.

Reference is hereby made to my application Serial No. D89,195, filed December 29, 1939, now Patent No. Des. 123,909, for Design for reinforcing sheet.

It will be appreciated that the details and examples hereinbefore set forth are illustrative only, and that my invention is not limited thereto but is defined by the claims hereinafter set forth.

What I claim and desire to protect by Letters Patent is:

1. A reinforcing and packaging material comprising a plurality of relatively thin, open-centered elements of a synthetic plastic capable of being shaped under the influence of heat arranged in edge to edge contact and secured to one another at their points of contact.

2. A reinforcing and packing material comprising a plurality of relatively thin, open-centered elements of a synthetic plastic capable of being shaped under the influence of heat arranged in edge to edge contact and cemented to one another at their points of contact by an adhesive material.

3. A reinforcing and packaging material comprising a plurality of relatively thin, open-centered elements of a synthetic plastic capable of being shaped under the influence of heat arranged in edge to edge contact and fused to one another at their points of contact.

4. A reinforcing and packaging material comprising a plurality of open-centered elements of a synthetic plastic capable of being shaped under the influence of heat having a maximum diameter of from 8 to 24 times, and a thickness not substantially in excess of, the width of the rim portion thereof, said elements being arranged in edge to edge contact and secured to one another at their points of contact.

5. A reinforcing and packaging material comprising a plurality of relatively thin, annular elements of a synthetic plastic capable of being shaped under the influence of heat arranged in edge to edge contact and secured to one another at their points of contact.

6. A reinforcing and packaging material comprising a plurality of relatively thin, annular elements of a synthetic plastic capable of being shaped under the influence of heat arranged in edge to edge contact in closely packed formation and secured to one another at their points of contact.

7. A reinforcing and packaging material comprising a plurality of relatively thin, open-centered elements of a thermoplastic material comprising compressed and surface hardened zein, arranged in edge to edge contact and secured to one another at their points of contact.

8. A reinforcing and packaging material comprising a plurality of relatively thin, open-centered elements of a thermoplastic material comprising compressed zein surface hardened by treatment with glacial acetic acid, arranged in edge to edge contact and secured to one another at their points of contact.

9. A reinforcing and packaging material comprising a plurality of relatively thin, open-centered elements of a thermoplastic material comprising compressed zein surface hardened by treatment with glacial acetic acid, arranged in edge to edge contact and fused to one another at their points of contact through treatment with glacial acetic acid.

10. The process of forming a reinforcing and packaging material which comprises forming a plurality of relatively thin, open-centered elements of compressed, finely ground, substantially fat-free zein, arranging the elements in edge to edge contact, fusing them to one another at their points of contact by localized treatment with a hardening or gelatinizing agent, and surface-hardening the article so formed by immersion in a bath of said agent.

11. The process of forming a reinforcing and packaging material which comprises forming a plurality of relatively thin, open-centered elements of compressed, finely ground, substantially fat-free zein, arranging the elements in edge to edge contact, fusing them to one another at their points of contact by localized treatment with glacial acetic acid, and surface-hardening the article so formed by immersion in a bath of glacial acetic acid.

12. A reinforcing and packaging material comprising a plurality of relatively thin, open-centered elements of a thermoplastic material comprising a compressed and surface-hardened vegetable protein, arranged in edge to edge contact and secured to one another at their points of contact.

13. The process of forming a reinforcing and packaging material which comprises forming a plurality of relatively thin, open-centered elements of a compressed, finely ground, substantially fat-free vegetable protein, arranging the elements in edge to edge contact, fusing them to one another at their points of contact by localized treatment with a hardening or gelatinizing agent, and surface-hardening the article so formed by immersion in a bath of said agent.

CHARLES H. LUBY.